Patented Nov, 17, 1925.

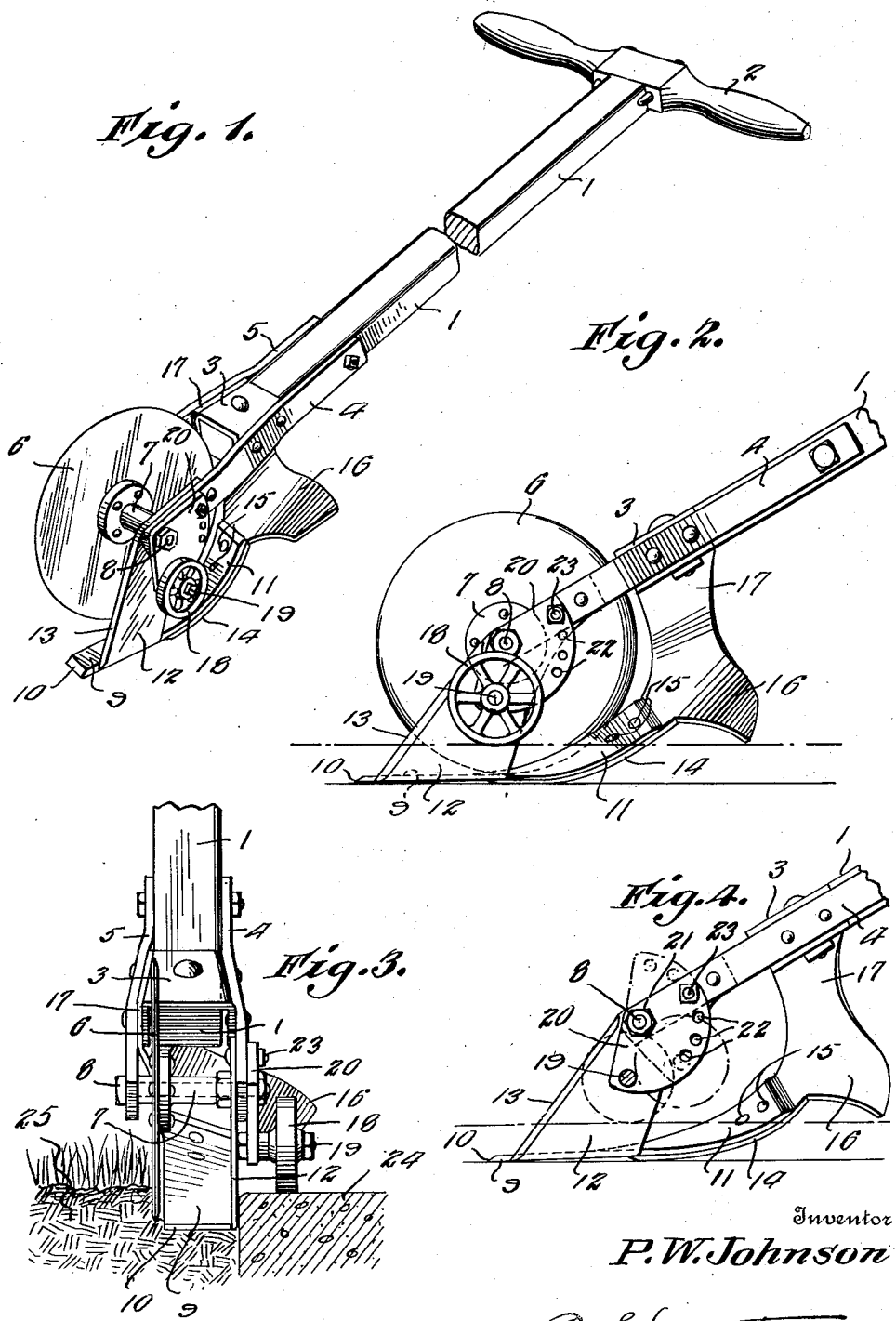

1,562,174

UNITED STATES PATENT OFFICE.

PETER W. JOHNSON, OF COEUR d'ALENE, IDAHO.

LAWN TRIMMER.

Application filed August 27, 1924. Serial No. 734,454.

*To all whom it may concern:*

Be it known that I, PETER W. JOHNSON, a citizen of the United States, residing at Coeur d'Alene, in the county of Kootenai and State of Idaho, have invented a new and useful Lawn Trimmer, of which the following is a specification.

The object of my invention is to provide an improved lawn trimmer of novel construction and, involving a novel combination and arrangement of parts. I attain these and other objects of my invention by the device illustrated in the accompanying drawings, in which—

Figure 1 is a perspective view of my invention;

Fig. 2 is a side elevation of same;

Fig. 3 is a front elevation of same; and

Fig. 4 is a detail view of the frame construction.

Like numerals designate like parts in each of the several views.

Referring to the accompanying drawings, I provide a conventional handle 2 and shaft 1 to which are attached the metal frame members 4 and 5 affixed to the metal strap 3 which encircles the end of shaft 1, as shown in Fig. 1. I provide a circular trimmer blade 6 mounted on stub shaft or axle 7 the threaded end 8 of which is engaged by a suitable nut, as shown in Fig. 1. I provide a gauge wheel 18 mounted on stub shafts 19 carried by the segment 20 which is secured to the desired adjusted position by the bolt and nut 23 which engages in any of the openings 22, as shown in Figs. 2 and 4. I also provide a shoe or runner 9 having a beveled end 10 the curved portion 11 of said shoe or runner being affixed by suitable rivets 15 to the correspondingly curved portion 14 of the frame member 17 which has a flange 16, as shown in the several views of the drawings. Runner 9 is braced by the integral bracing member 12, its front edge 13 being beveled to form a cutting edge.

What I claim is:

1. A lawn trimmer comprising a circular blade, a frame in which said blade is rotatably mounted, said frame having a flaring flange offset on one side thereof, and having a downwardly curved portion, a shoe attached to said curved portion, and an integral bracing member on said shoe.

2. In combination with the apparatus described in claim 1 a segment having a series of spaced apertures, a gauge wheel mounted on said segment, and means for detachably securing the segment to the frame in various positions to change the height of the gauge wheel relative to the rest of the apparatus.

3. In a lawn trimmer, the combination of a rotating blade, a frame in which said blade is mounted, said frame having a flaring flange extending from a point rearward of the rotating blade to a point sufficiently one side thereof to throw the cuttings onto the walk or curb, a gauge wheel positioned exteriorly of the frame to permit the gauge wheel to run along the curb when the trimmer is in operation, and a shoe positioned adjacent the rotating blade and having a beveled end to form a cutting edge, and a handle attached to the frame for pushing the implement in front of the operator.

4. In combination with the apparatus described in claim 3, a segment having a series of spaced apertures, a gauge wheel mounted on this segment and means for adjustably securing the segment on the frame to change the height of the gauge wheel relative to the rest of the apparatus.

PETER W. JOHNSON.